(12) United States Patent
Brock

(10) Patent No.: US 7,748,629 B2
(45) Date of Patent: Jul. 6, 2010

(54) EXTENDED WORKING RANGE ILLUMINATION SYSTEM FOR AN IMAGING-BASED BAR CODE READER

(75) Inventor: Christopher Brock, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1136 days.

(21) Appl. No.: 11/343,761

(22) Filed: Jan. 31, 2006

(65) Prior Publication Data

US 2007/0176003 A1 Aug. 2, 2007

(51) Int. Cl.
G06K 7/10 (2006.01)

(52) U.S. Cl. .............................. 235/462.11; 235/462.15; 235/462.18; 235/462.19; 235/462.22; 235/462.24; 235/462.25; 235/462.31; 235/462.32; 235/462.41

(58) Field of Classification Search ............ 235/462.11, 235/462.15, 462.18, 462.19, 462.22, 462.24, 235/462.25, 462.31, 462.32, 462.41
See application file for complete search history.

(56) References Cited

U.S. PATENT DOCUMENTS

| | | | |
|---|---|---|---|
| 4,251,798 A | 2/1981 | Swartz et al. | |
| 4,369,361 A | 1/1983 | Swartz et al. | |
| 4,387,297 A | 6/1983 | Swartz et al. | |
| 4,409,470 A | 10/1983 | Shepard et al. | |
| 4,760,248 A | 7/1988 | Swartz et al. | |
| 4,818,886 A | 4/1989 | Drucker | |
| 4,896,026 A | 1/1990 | Krichever et al. | |
| 5,324,924 A | 6/1994 | Cal et al. | |
| 5,468,951 A | 11/1995 | Knowles et al. | |
| 5,734,157 A * | 3/1998 | Liou | 250/216 |
| 6,138,915 A | 10/2000 | Danielson et al. | |
| 2005/0103868 A1* | 5/2005 | Zhu et al. | 235/462.46 |

FOREIGN PATENT DOCUMENTS

WO  WO2007/089399  9/2007

OTHER PUBLICATIONS

International Search Report of International Application No. PCT/US07/00509, International Filing Date Jan. 9, 2007, 2 pgs.
Written Opinion of International Application No. PCT/US07/00509, International Filing Date Jan. 9, 2007, 5 pgs.

* cited by examiner

*Primary Examiner*—Michael G Lee
*Assistant Examiner*—Kristy A Haupt

(57) ABSTRACT

A method and apparatus for reading a target object having areas of differing light reflectivity on the target such as a handheld bar code reader having a first illumination pattern, a detector for measuring a distance from the reader to a target object, a system threshold, and a comparator for evaluating the measured distance against the threshold. Should the reader's internal circuitry and/or software determine that the measured distance is greater than the threshold, a second illumination pattern is activated that has power effective illumination for increasing the operable reading distance between the reader and the target object. The second illumination pattern can be generated from a secondary illumination source or through a lens internal to the reader.

41 Claims, 5 Drawing Sheets

EXTENDED WORKING RANGE ILLUMINATION SYSTEM FOR AN IMAGING-BASED BAR CODE READER

FIELD OF THE INVENTION

The present invention relates to an illumination system for an imaging-based bar code reader and, more particularly, to an illumination system for an imaging-based bar code reader having an enhanced illumination source that is selectively actuated to increase an effective working range of the reader.

BACKGROUND ART

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing charged coupled device (CCD) or complementary metal oxide semiconductor (CMOS) based imaging systems are typically referred to hereinafter as imagining systems, imaging-based bar code readers or bar code scanners.

Bar code reader systems electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like. Scanning systems of this nature have been disclosed for example, in U.S. Pat. Nos. 4,251,798; 4,369,361; 4,387,297; 4,409,470; 4,760,248; and 4,896,026, all of which have been assigned to the assignee as the instant application.

Imaging readers employing CCD type technology typically employ an illumination system to flood a target object with illumination from a light source such as a light emitting diodes (LED) in the reader, and each CCD cell is sequentially read-out to determine the individual spacing in the bar code. Imaging systems include CCD arrays, CMOS arrays, or other imaging pixel arrays having a plurality of photosensitive elements or pixels. Light from the light source or LED is reflected from a target object, such as a bar code. The reflected light is then focused through a lens of the imaging system onto the pixel array, the target object being within a field of view of the lens. An analog-to-digital converter then digitizes output signals generated from the pixels of the pixels array. Decoding circuitry of the imaging system then processes the digitized signals and attempts to decode the imaged bar code.

The working range of prior art CCD and CMOS imaging-based bar code reader may be limited by the illumination system and ambient lighting. As the distance between the target object and the illumination system increases, the intensity of the illumination at the target object decreases. Reflected illumination from the target object is focused on the pixels of the CCD pixel array. Depending on the characteristics of the CCD pixel array, some minimal level of reflected illumination is necessary to successfully capture the image of the target object and decode the indicia encoded in the captured image. Thus, as the target object distance is increased, the intensity required from the illumination system increases thereby increasing the power requirements of the illumination system. Since most readers are battery powered, minimizing power requirements to increase working time between recharges is of great importance.

Additionally, the focusing lens of the imaging assembly is characterized by an angular field of view in the horizontal and vertical directions. Therefore, as the target object distance increases, the portion of the field of view occupied by the target object necessarily decreases. Due to the fact that the effective illumination is decreasing at a factor of the distance to the target object squared, greater illumination intensity from the illumination system will be required to successfully image the target object. If the reader utilizes a single illumination system for both short and long working range-imaging applications, a high intensity illumination system will be required to image target objects at longer working ranges. Such a high intensity illumination system will waste power by illuminating the entire field of view unnecessarily when only a subset of the field of view (FOV) is necessary.

What is need is an imaging-based reader, such as an imaging-based bar code reader, including an imaging system for imaging a target object in a field of view of the imaging system and an illumination system that provides for an increased effective range of the imaging system. What is also needed is an imaging-based reader that provides an illumination system comprising a first illumination pattern for imaging a target object within a first imaging range and a second illumination pattern to be used to conjunction with the illumination system, to extend the effective imaging range of the imaging system to a second imaging range greater than the first imaging range.

SUMMARY

The present disclosure is directed to an apparatus and method of scanning and reading target objects, including target indicia such as a bar code having areas of differing light reflectivity. Such apparatus would include various forms and types of bar code scanners and readers including both portable and fixed devices. Such types of readers would include an illumination source energizable to emit a first illumination pattern.

The illumination source of the reading devices of the present disclosure are further capable of energizing to emit a novel second illumination pattern that is activated when a measured, estimated, or deduced distance to the target object is greater than a distance from which the first illumination pattern is capable of obtaining a sufficient reading of the target object. This second illumination pattern provides power effective illumination that increases the operable reading distance between the reader and the target object.

In one aspect, the reader's second illumination pattern is higher in intensity, which is obtained by projecting the illumination through a converging lens and or reflective concentrating device that condenses or concentrates the illumination toward the target object. The source of illumination projected through the lens or reflective concentrator can be from the same source that projects the first illumination pattern or it can be from a completely independent source.

The second illumination pattern can also result from a designated light emitting diode "LED" or from a bank of LEDs separate from the system's primary illumination source. This second illumination pattern is activated when the measured amount of reflected illumination is insufficient (less than the system threshold) to provide an acceptable reading or when the target objects are at a distance beyond the working range of the first illumination pattern, a system threshold distance.

Another feature of the reader is the reduction of light pollution to the surrounding environment since the secondary illumination pattern is inactive during the reading or scanning of objects at a distance less than the system's threshold. A separate aspect of the reader narrows the illumination pattern by concentrating the pattern to a subset of the total FOV, thus saving power and avoiding annoying 'overspread' of intense illumination.

Another aspect of the reader is the system's threshold can be prescribed by the internal circuitry or software, or is capable of being autonomous by allowing self governing changes based on image quality or environmental conditions.

Yet another aspect of the present disclosure is the enabling of the second illumination pattern that is contingent on auto exposure control processes or on differing distance measuring methods, which include auto focusing or range finding techniques.

These and other objects, advantages, and features of the exemplary embodiments are described in detail in conjunction with the accompanying drawings.

DETAILED DESCRIPTION

An imaging-based reading system is shown schematically at 10 in FIGS. 1 through 4B. A typical profile of a portable bar code reader 20 is physically shown in FIGS. 1, 2, 4A, and 4B. In addition to imaging and decoding 1D and 2D bar codes, including postal codes, and Code 39 bar codes, the reading system 10 is also capable of capturing images and signatures. In a preferred embodiment of the present invention, the bar code reader 20 is a hand held portable reader that can be carried and used by a user walking or riding through a store, warehouse, or plant, while reading bar codes for stocking and inventory control purposes.

However, it should be recognized that the imaging-based bar code reader 20 of the present invention, to be explained below, may be advantageously used in connection with any type of imaging-based automatic identification system including, but not limited to, bar code scanners, signature imaging acquisition and identification systems, optical character recognition systems, fingerprint identification systems and the like. It is the intent of the present invention to encompass all such imaging-based automatic identification systems.

Figure 1:
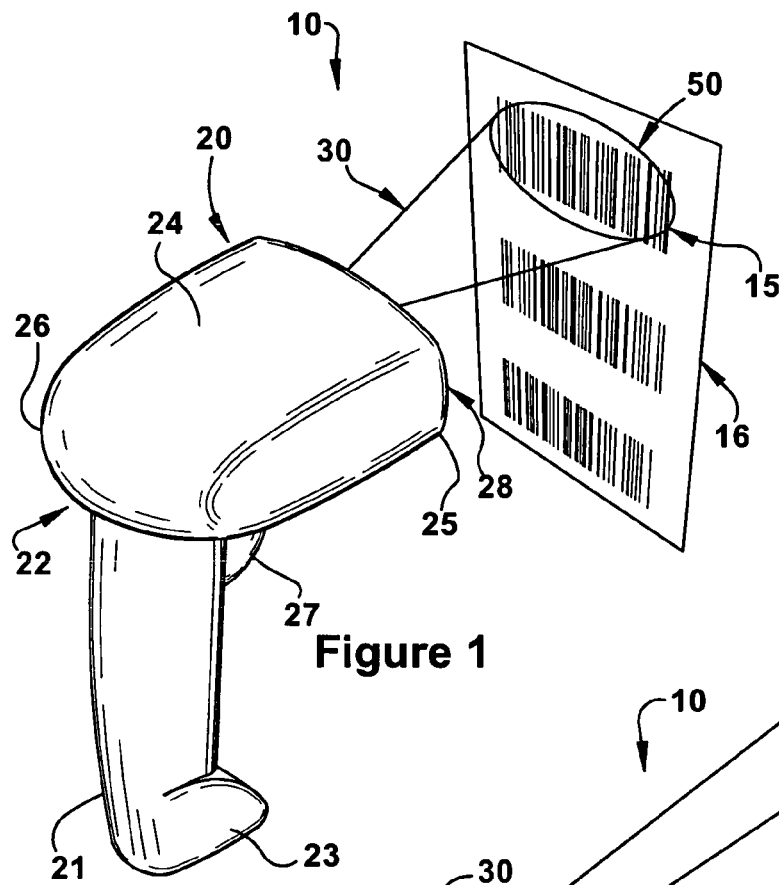
FIG. 1 is a perspective view of an imaging-based bar code reader reading an individual barcode from a series of bar codes in a "pick list"
Figure 2:
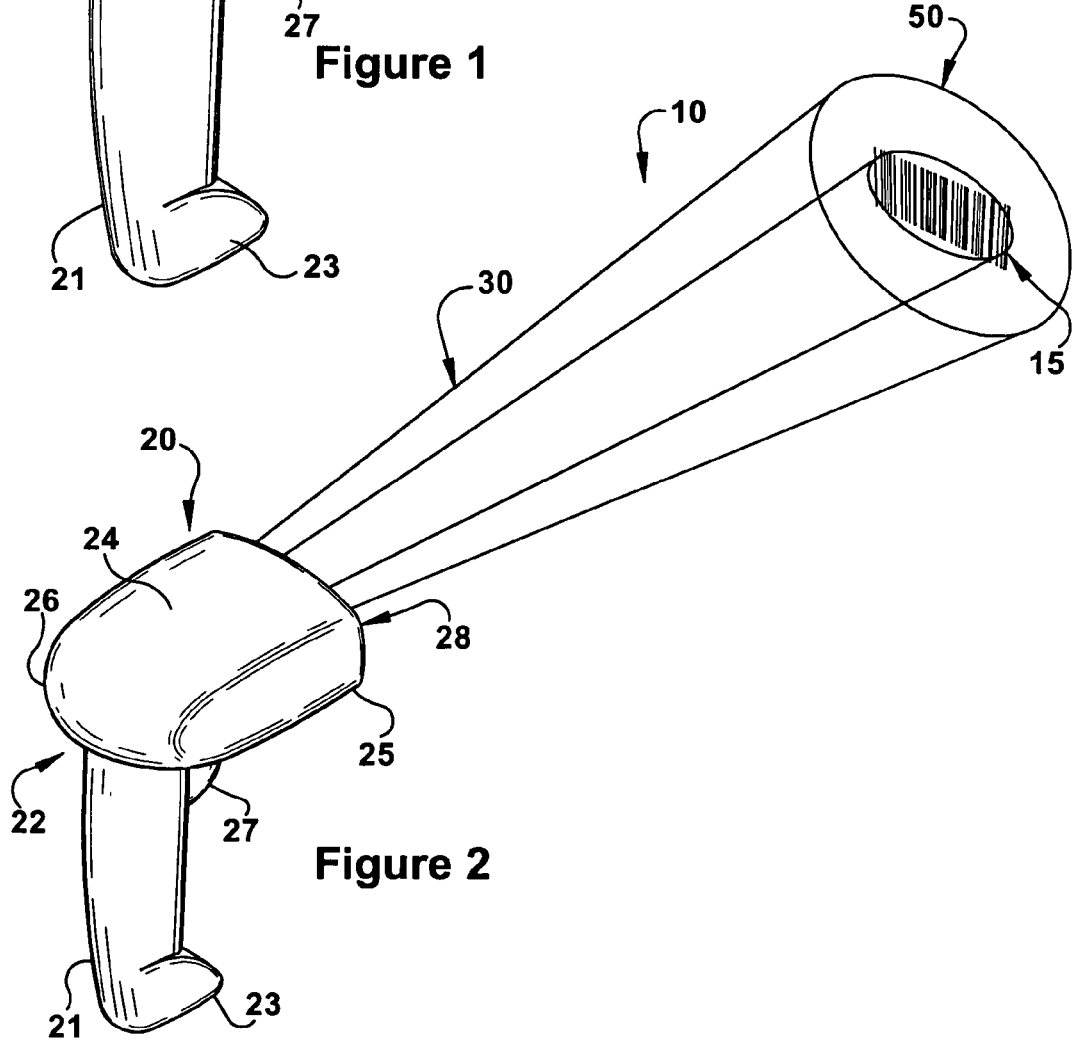
FIG. 2 is a perspective view of an imaging-based bar code reader projecting a first and second illumination pattern, such that the second illumination pattern originates from a lens internal to the reader, indicating the reduced FOV necessary to read the barcode.

Turning now to the figures and more specifically, FIGS. 1 and 2 that show the bar code reader 20 to include a handle 21, which is located between an upper end 22 and lower end 23 of the reader 20. The reader further includes a reading portion or head 24 situated between a first and second ends 25 and 26, respectively.

Typically located about the upper end 22 of the handle 21 is a trigger 27, when engaged by the operator initiates the reading of a target object or bar code 15. The trigger 27 is coupled to the reader's circuitry for initiating the reading of the target bar code 15, which is often positioned on an article such as a package, or at times on a pick list 16, as shown in FIG. 1 that includes an array of bar codes with spaces or voids therebetween.

If the reading process is to be manually performed by an operator, the process is typically activated by engaging the trigger 27. An automated reading system may be initiated by an instruction internal to the system's software or circuitry. For either the manual or automatic reading system an illumination source is energized projecting a first illumination pattern 30 from the first end 25 of the reader 20 through a window 28, as shown in FIGS. 1 and 2.

Figure 3A:
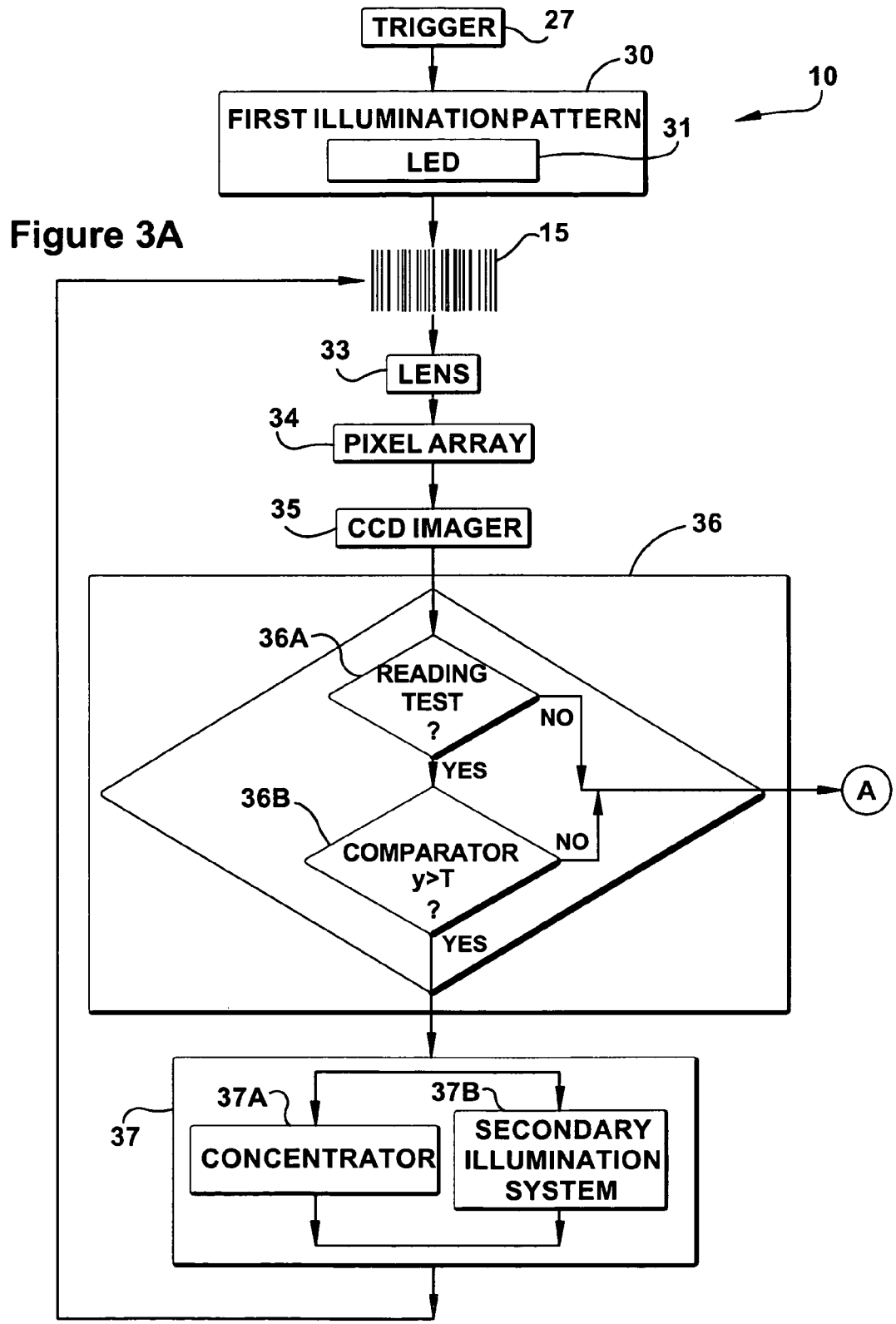
FIG. 3A is a flow diagram of an imaging-based bar code reader process projecting a first and second illumination pattern upon a target bar code.
Figure 3B:
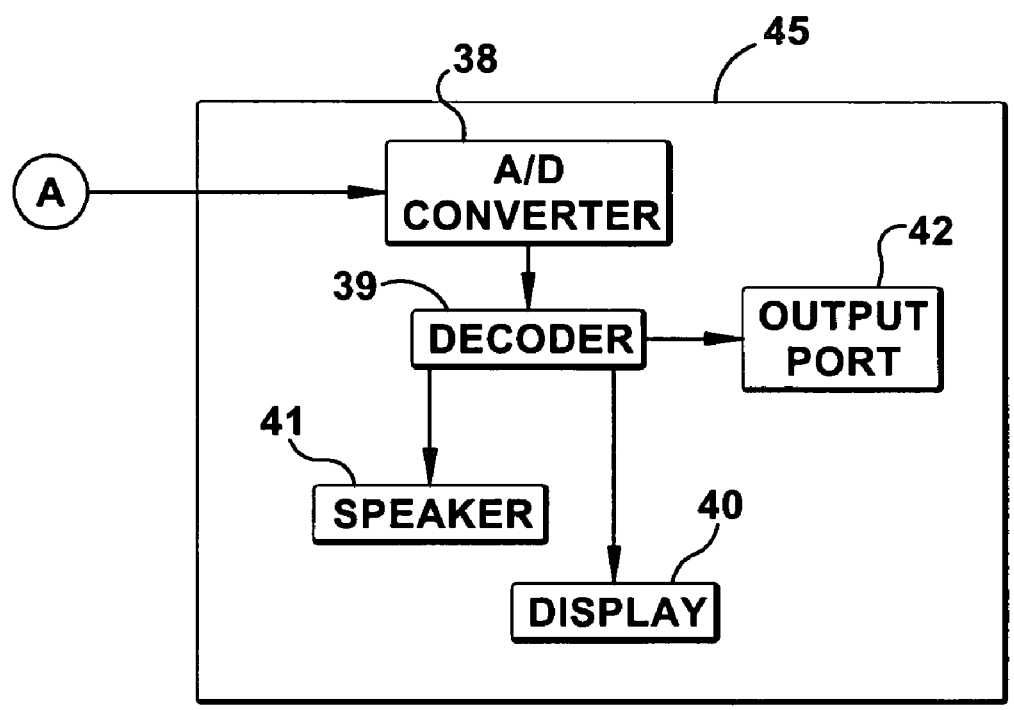
FIG. 3B is a continuation of the flow diagram depicted in FIG. 3A.

Referring now to FIGS. 3A and 3B is a process for reading a target barcode described in a highly simplified block diagram. FIGS. 3A and 3B show the general flow of the bar code reader system 10. Once the first illumination pattern 30 is projected upon the target bar code 15 it is reflected back toward the reader 20 through a lens 33. The lens focuses the reflected image on a pixel array 34 that is tied to a CCD imager 35. The first illumination pattern 30 typically originates from a light emitting diode LED 31 or a bank of LEDs.

Internal test operations 36 are then tied into the reflected image read by the CCD imager 35. The test operations are performed by either the hardware or software systems or a combination thereof, internal to the reader system 10. In the first test operation 36A, the reader logically determines by historical information whether the read image is from a first reading or from a subsequent reading iteration. If the reading is a first reading a second test operation 36B is required to determine whether the distance to the target object or bar code 15 is at a distance beyond the range of the first illumination pattern. The imaged information advances to an imaging analysis system 45 (discussed later in detail) if the amount of reflected illumination is sufficient, or if the reading is found sufficient despite imperfect illumination, which can occur because of the ambient conditions, or due to highly reflective or contrasting symbols used on the target object.

Programming techniques utilized by those skilled in the art can vary the number of required reading iterations before advancement to the imaging analysis system 45. Inferior, unreadable, or a deficient number of readings based on system parameters are just a few reasons why multiple readings may be required before advancement of the imaged information to the imaging analysis system 45.

The second test operation 36B can be a range detection test that determines whether the distance between the target object 15 and the reader 20 is an acceptable distance. Alternatively, the test operation 36B can be a series of increased illumination cycles that occurs until adequate illumination achieved. If the distance is found to be too great or the illumination remains inadequate after a prescribed number of cycles, the system will actuate a second illumination pattern 37.

Several different methods can be utilized for determining whether the estimated or measured distance of the object to be read is acceptable. For example, such techniques include those used for auto focusing systems and laser ranging.

Laser ranging is another method for determining the distance between the reader and the target object. Laser ranging is accomplished by emitting a laser-aiming pattern from the reader toward the target object 15. The laser beam is then reflected back to the reader, which focuses the beam through a lens on the pixel array. The beam paths to, and from the target object 15 are traced forming geometric relationships that are used to determine the distance to the targeted object. More specifically, the distance to the target object can be derived from algorithms based on a combination of these geometric relationships and related lens equations through which the laser beam passes.

Focusing techniques for determining distance utilize a search routine to move the reader lens along a path of travel that analyzes multiple image frames of the target object 15 as the images are reflected upon the pixel array at different lens locations. Each image is then analyzed for image clarity until a suitable lens position is determined. The movement of the lens is performed via a search routine or heuristic that can be interpolated to an associated distance value that is used in determining the range to the target object.

While two different techniques for determining distances to the target object have been discussed, it will be understood that other techniques for measuring distances known to those skilled in the art could be employed as the comparative test operation 36B.

Alternatively, other test operations 36B for determining whether to use the second illumination systems might exist without using a ranging technique. For example, an auto exposure control technique could be employed. This would allow the illumination to increased through consecutive image acquisition and evaluation cycles that check for adequate illumination by testing average pixel values. If after a prescribe number of iterations adequate illumination is not achieved, the system activates the second illumination pattern 37.

Figure 4A:
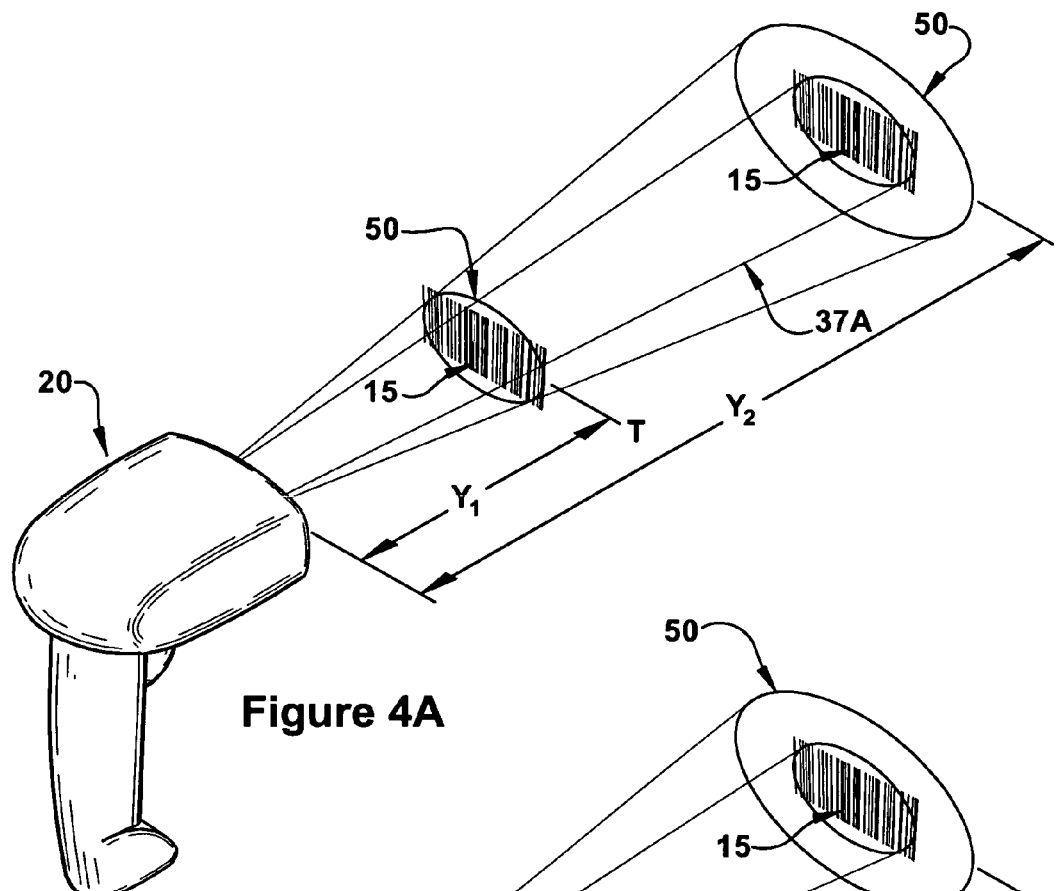
FIG. 4A is an isometric view of an imaging-based bar code reader reading a target bar code at first distance Y1 requiring only a first illumination pattern and reading a target bar code at a second distance Y2 requiring a second illumination pattern that is being projected from a lens internal to the reader.
Figure 4B:
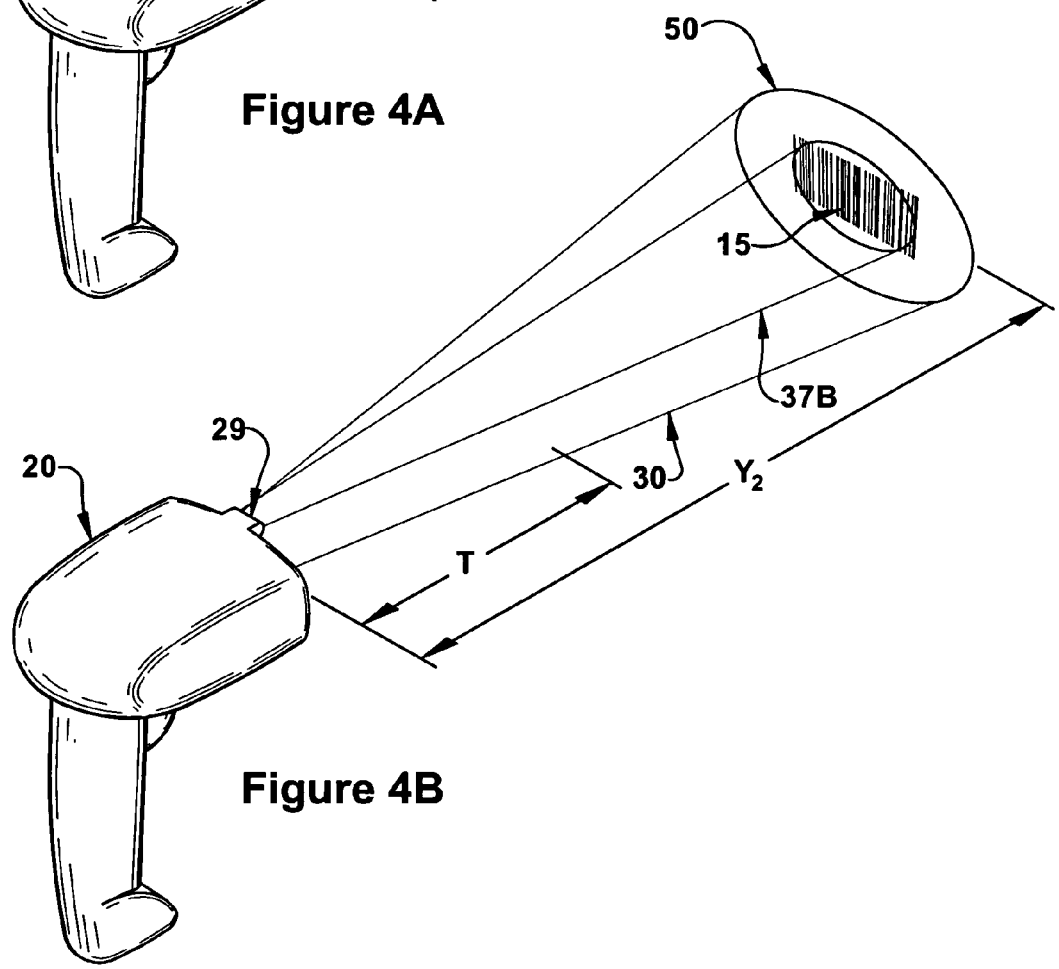
FIG. 4B is an isometric view of the imaging-based bar code reader reading a target bar code at a distance requiring a second illumination pattern that originates from a separate LED or bank of LEDs.

If it is determined by the comparative test operation 36B that the distance from the reader 20 to the target object 15 is less than a designated threshold "T" depicted in FIGS. 4A and 4B or illumination is adequate, then the read image is presumed of sufficient quality to warrant advancement to the imaging analysis system 45. It should be noted however, that a sufficient reading could also advance to the imaging analysis system 45 despite imperfect illumination for the reasons previously discussed.

The threshold T is a parameter that can be manually adjusted and set by alterations in the reader's hardware or software programs. Alternatively, the threshold parameter can be autonomously established by internal intelligence in the reader's software acknowledging a lack of signal recognition or strength, or changes or drains to the reader's power requirements. Should the calculated distance to the target object 15 be greater than the designated threshold T, then the second illumination pattern 37 is employed. Alternatively, if the illumination is less than the threshold T after a prescribed number of iterations of increasing illumination, then the second illumination pattern 37 is employed.

In the preferred embodiment the second illumination pattern 37 originates from a concentrator 37A of a portion of the first illumination pattern 30, but is driven with more energy or a higher concentration of power relative to the rest of the first illumination pattern. The concentrator 37A projects the first illumination pattern 30 through a converging lens or a reflective concentrator resulting in the second illumination pattern that is intensified on the target object or bar code 15 and thereby increasing the reader's operable distance. The utilization of a concentrator 37A in the second illumination pattern 30 is best seen in FIGS. 2, and 4A. The full field of view 50 is the projected first illumination pattern that increases in size and decreases in readable image quality as the distance to the target object increases.

Figure 5:
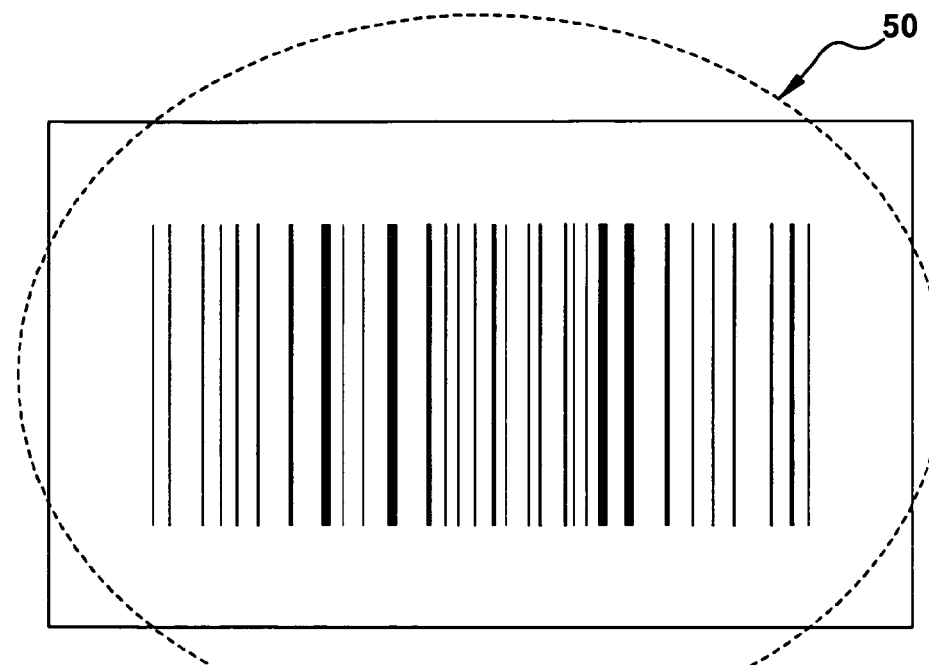
FIG. 5 is a representation of a first illumination pattern encompassing a target bar code at a large distance by reader used in the prior art.
Figure 6:
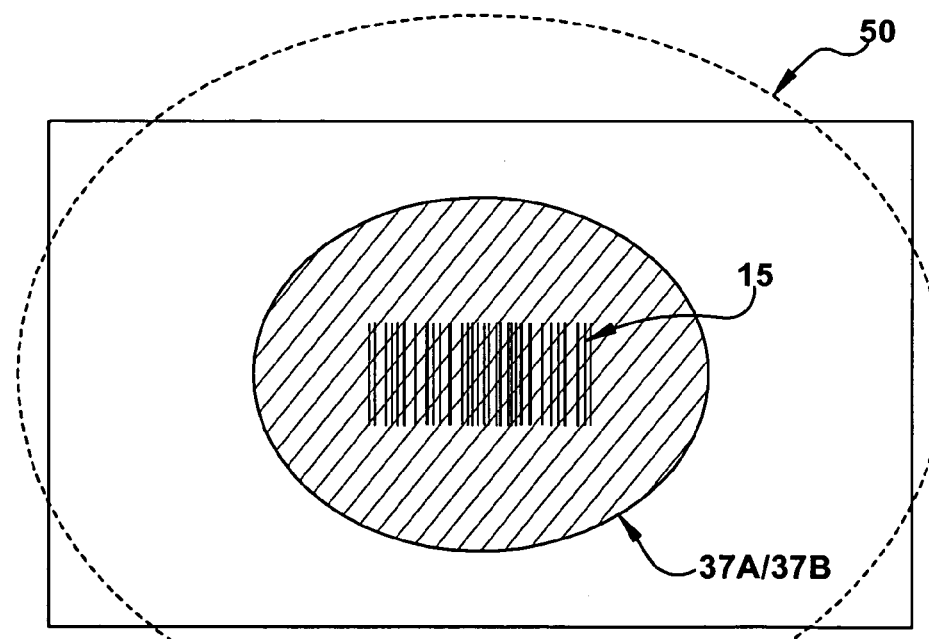
FIG. 6 is a representation of a second illumination pattern encompassing a target bar code at a large distance.

The first illumination pattern 30 aimed at a target bar code 15 as found in the prior art can be seen in FIG. 5. The addition of the second illumination pattern 37 by comparison is depicted in FIG. 6. Typically, the second illumination pattern will be located about the center of the first illumination pattern's field of view 50.

Only when the test operations 36 are satisfied is the second illumination pattern 37 activated, thereby increasing the overall working range of the reader by providing better illumination without overly burdening the electrical current budget for the reading system 10. Another advantage of the second illumination pattern 37 is since it is enabled only under certain controlled conditions it needs only minimal illumination and power requirements when reading items at a distance less than the threshold T, thereby minimizes irritation to the user, surrounding operators and environment. This advantageously saves power during close range reads or scans, creating a power reserve available for situations when objects are read at a greater distances needing the second illumination pattern. Controlling the activation of the second illumination pattern allows the portable reading systems to conserve power resulting in longer time periods without recharging the system's power supply. In addition, the second illumination pattern conserves power by concentrating the illumination on the target object requiring only a portion or subset of the original FOV.

In another embodiment, the second illumination pattern 37 is a secondary illumination system or device 37B. The secondary illumination device 37B like the concentrator 37A is typically located about the center of first illumination pattern field of view 50, and needs only to illuminate a subset of the full field of view, as shown in FIGS. 4B and 6. However, the secondary illumination device 37B can act independently of the first illumination pattern 30. The secondary illumination device can be an electrical component 29 such as an LED or a bank of LEDs that is activated when the distance from the reader to the target object 15 exceeds the threshold T, or when a prescribed number of iterations increasing the illumination are found insufficient for an adequate reading. By enabling the secondary illumination device 37B under controlled conditions, light pollution to the environmental surroundings is again minimized as well power requirements are minimized when reading objects at a distance less than the threshold T.

Returning again to FIGS. 3A and 3B, once the second illumination pattern 37 is enabled, the target bar code is reread reflecting a subsequent image through lens 33 onto the pixel array 34. Once the pixel array is read, an analog signal is generated by the CCD imager 35. This image is stored in binary form in a buffer or database until the next process occurs.

Assuming that the prescribed number of reading iterations has been satisfied and the read image is of acceptable quality, the read image is advanced to the imaging analysis system 45.

As discussed previously, the number of reading iterations through the first test operation 36A is controlled by parameters set in the reader's hardware or software or both. The system may require several iterations before a complete image is acquired that would allow a successful decode of the target object and the number of iterations required could be internally controlled until a successful decoding operation is achieved.

An analog to digital ("A/D") converter 38 located in the imaging analysis system 45, receives the stored analog image from the CCD imager 35. The A/D converter 38 then sends a digital signal to a decoder 39 where it becomes synthesized by the decoder's internal circuitry. The microprocessor in the reader processes the image and attempts to decode it into a data stream. If the decode is successful, the decode session is terminated with the decoded information being transmitted to a number of reader peripherals. These would include for example, visual display devices 40 such as a monitor or LED, a speaker 41, or an output port 42 for obtaining an operator's attention. If the decode is unsuccessful, the first test operation 36A may autonomously increase allowing the decode session to continue with repeated image acquisitions by the reader 20.

While the present invention has been described with a degree of particularity, it is the intent that the invention includes all modifications and alterations from the disclosed design falling with the spirit or scope of the appended claims.

I claim:

1. An illumination assembly for emitting illumination for imaging a target object, the imaging assembly comprising:
    a) an illumination source energizable to emit a first illumination pattern when a distance to the target object is less than or equal to a prescribed value; and
    b) the illumination source energizable to emit a second illumination pattern when the distance to the target object is greater than the prescribed value, wherein the second illumination pattern is more concentrated than the first illumination pattern.

2. The illumination assembly of claim 1, wherein said second illumination pattern is produced by a concentrating lens.

3. The illumination assembly of claim 1, wherein said second illumination pattern is produced by a light emitting diode.

4. The illumination assembly of claim 1, wherein said assembly is a bar code scanner and the target object is a bar code that is imaged and decoded.

5. The illumination assembly of claim 1, wherein said second illumination pattern is produced by a reflective concentrator.

6. A bar code reader for imaging a target bar code comprising:
    a) imaging assembly for imaging and decoding a bar code;
    b) a range assembly for determining a distance from the imaging assembly to the target bar code;
    c) illumination assembly for emitting illumination for imaging the target bar code the imaging assembly including:
        1) an illumination source energizable to emit a first illumination pattern when a distance to the target bar code is less than a predetermined value; and
        2) the illumination source energizable to emit a second illumination pattern when the distance to the target bar code is greater than the predetermined value, wherein the second illumination pattern is more concentrated than the first illumination pattern.

7. The bar code reader of claim 6, wherein said second illumination pattern is generated from a concentrating lens.

8. The bar code reader of claim 6, wherein said second illumination pattern is generated from at least one light emitting diode.

9. The bar code reader of claim 6, wherein said second illumination pattern is generated from a reflective concentrator.

10. A reading apparatus for decoding areas of differing light reflectivity on a target comprising:
    a) an illumination source for producing a first illumination pattern;
    b) a detector for measuring a distance from said reading apparatus and a target object;
    c) a system threshold;
    d) a comparator for evaluating the measured distance against said threshold; and
    e) a second illumination pattern that is activated when said measured distance is greater than said threshold, wherein the second illumination pattern is more concentrated than the first illumination pattern.

11. The reading apparatus of claim 10, wherein said second illumination pattern is generated from a converging lens for increasing the concentration of the illumination on the target object.

12. The reading apparatus of claim 10, wherein said second illumination pattern is generated from at least one light emitting diode.

13. The reading apparatus of claim 12, wherein the light emitting diode is independent from said first illumination pattern.

14. The reading apparatus of claim 10, wherein said second illumination pattern is generated from a reflective concentrator for increasing the concentration of the illumination on the target object.

15. The reading apparatus of claim 10, wherein said second illumination pattern is dependent from said first illumination pattern.

16. The reading apparatus of claim 10, wherein said a second illumination pattern is activated when said measured distance is greater than or equal to said threshold.

17. The reading apparatus of claim 10, wherein said a threshold is autonomously configured.

18. The reading apparatus of claim 10, wherein said a threshold is prescribed by external conditions.

19. The reading apparatus of claim 10, wherein the reading apparatus is a bar code scanner and the target object is a bar code that is imaged and decoded.

20. A method for imaging a target bar code, the steps of the method comprising:
    a) determining a distance from the imaging assembly to the target bar code;
    b) energizing an illumination assembly for emitting illumination for imaging a target bar code an illumination source energizable to emit a first illumination pattern when a distance to the target bar code is less than or equal to a predetermined value; and
    c) the illumination source energizable to emit a second illumination pattern when the distance to the target bar code is greater than the predetermined value, wherein the second illumination pattern is more concentrated than the first illumination pattern.

21. The method for imaging a target bar code of claim 20, wherein said second illumination pattern is generated from a converging lens.

22. The method for imaging a target bar code of claim 20, wherein said second illumination pattern is generated from at least one light emitting diode.

23. The method for imaging a target bar code of claim 20, wherein said second illumination pattern is generated from a reflective concentrator.

24. A method of reading a target article comprising:
   a) projecting a first illumination pattern from an imaging system across a target article;
   b) reflecting said first illumination pattern from said target article to a lens located in said imaging system;
   c) directing said reflected illumination across a pixel array generating an image;
   d) reading said image produced in the pixel array in a CCD imager;
   e) comparing a measured distance from said imaging system to said target article against a threshold of said imaging system;
   f) sustaining the first illumination pattern if when comparing the measured distance against the threshold of imaging system its determined that the measured distance is less than said threshold; and
   g) employing a second illumination pattern if when comparing the measured distance against the threshold of imaging system its determined that the measured distance is greater than said threshold, wherein the second illumination pattern is more concentrated than the first illumination pattern.

25. The method of reading a target article of claim 24, wherein the concentrated illumination pattern is produced by a lens having a concentrating effect.

26. The method of reading a target article of claim 24, wherein the concentrated illumination pattern is produced by at least one light emitting diode.

27. The method of reading a target article of claim 24, wherein the threshold is prescribed by interpolation techniques of the imaging system based on the quality of the image produced by the pixel array.

28. The method of reading a target article of claim 24, wherein the threshold is prescribed by software parameters of the imaging system.

29. The method of reading a target article of claim 24, wherein the threshold is prescribed by environmental conditions surrounding the imaging system.

30. The method of reading a target article of claim 24, wherein the imaging system is a bar code reader and the target article is a bar code that is imaged and decoded.

31. The method of reading a target article of claim 24, wherein the concentrated illumination pattern is produced by a reflective concentrator.

32. An automatic imaging system having a first illumination pattern that is directed at a target object when the system is actuated and an imaging system including a pixel array, a focusing lens to focus an image of the target object onto the pixel array, the automatic imaging system comprising:
   a) software and/or circuitry for analyzing an image of the illumination reflected from the target object and projected onto the pixel array by the lens;
   b) an analytical technique to establish a measured variable;
   c) an imaging system threshold;
   d) a comparator for evaluating said measured variable to said imaging system threshold; and
   e) a second illumination pattern that is activated when said measured variable is greater than said imaging system threshold, wherein the second illumination pattern is more concentrated than the first illumination pattern.

33. The automatic imaging system of claim 32, wherein said imaging system threshold is autonomous based on surrounding environmental conditions.

34. The automatic imaging system of claim 32, wherein said imaging system threshold is prescribed.

35. The automatic imaging system of claim 32, wherein said second concentrated illumination is produced from concentrating the first illumination on the target object.

36. The automatic imaging system of claim 32, wherein said second concentrated illumination is produced from at least one light emitting diode that is independent of said first illumination.

37. The automatic imaging system of claim 32, wherein said second concentrated illumination is produced from a lens that concentrates the first illumination on the target object.

38. The automatic imaging system of claim 32, wherein the imaging system is a bar code reader and the target object is a bar code that is imaged and decoded.

39. The automatic imaging system of claim 32, wherein the analytical technique to establish a measured variable is a range finding technique.

40. The automatic imaging system of claim 32, wherein the analytical technique to establish a measured variable is an automatic focusing technique.

41. The automatic imaging system of claim 32, wherein the analytical technique to establish a measured variable is an auto exposure control technique.

* * * * *